Jan. 11, 1944.   M. M. ALBERTSON   2,339,129
RADIOLOGICAL METHOD OF SURVEYING WELLS
Filed Jan. 20, 1942
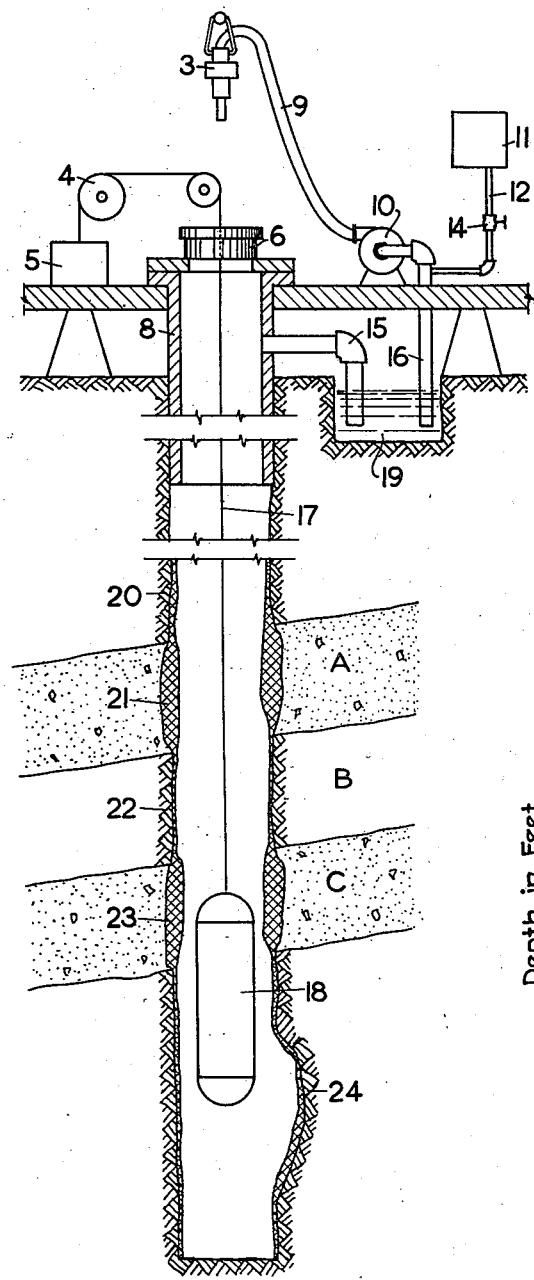
Fig. I
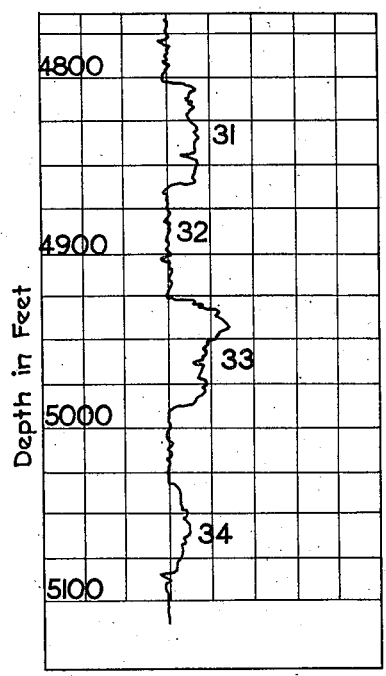
Fig. II
Inventor: Maurice M. Albertson
By His Attorney:

Patented Jan. 11, 1944

2,339,129

UNITED STATES PATENT OFFICE 2,339,129

RADIOLOGICAL METHOD OF SURVEYING WELLS

Maurice M. Albertson, Houston, Tex., assignor to Shell Development Company, San Francisco, Calif., a corporation of Delaware Application January 20, 1942, Serial No. 427,456

2 Claims. (Cl. 250—83.6)

This invention relates to methods of logging or coring wells, and pertains more particularly to radiological methods for determining the location, nature and characteristics of underground formations traversed by boreholes.

It is well known that coring is an essential operation attendant the drilling of wells. Cores obtained during drilling are carefully studied and analyzed for various purposes, such as for determining the location or level and the thickness of the layers traversed by a borehole, for correlating the values thus obtained in several wells in order to map the whole underground structure of the oil reservoir in which said wells are sunk, and especially for determining certain physical characteristics of said layers, such as their porosity, permeability, etc., which are of essential importance in production and exploitation work.

In view of the time loss and expenditure involved in mechanical coring, electrical coring or logging methods are at present extensively used, whereby the characteristics of the formations traversed by boreholes are electrically surveyed and recorded in the form of electrical well logs.

Both mechanical and electrical logging methods are, however, subject to certain drawbacks. Thus, cores mechanically obtained from a particular cross-section of a formation traversed by a borehole may, for various reasons, not be truly representative of the physical properties or nature of said formation as a whole, or may fail to indicate to the operator the presence of fissures, cavities or crevices in said formation. Electrical coring methods give only indirect and generally vague indications as to the physical nature of the strata traversed by a borehole, and electrical logs sometimes present inadequate or misleading information in this regard.

It has therefore been proposed to replace or supplement the data of mechanical or electrical logging surveys by means of radiological well surveys, and various methods and devices have been developed for this purpose.

These methods involve the steps of lowering into a borehole a detector sensitive to radioactive radiation phenomena, such, for example, as a Geiger-Mueller counter or an ionization chamber, and transmitting to the surface, for recording purposes, the response of said detector to radioactive effects within the borehole.

These effects may be due to the natural radioactive properties of the formations traversed by the borehole, to the fact that said formations had been artificially energized or activated by radioactive means, or to the fact that some radioactive material had been placed within the borehole or within the formations immediately surrounding said borehole.

In my copending application Serial No. 330,747, filed April 20, 1940, I have disclosed a method for radiologically surveying boreholes with regard to the physical characteristics of the surrounding formations, such as their porosity, permeability, natural liquid content, etc., which method consisted in filling the borehole with a liquid comprising a radioactive tracer material, forcing said liquid into the formations by applying pressure, and thereafter logging the borehole by means of a radiological detector.

Although completely satisfactory and conclusive logs have been obtained by this method, said method requires certain preliminary or conditioning steps, which result in somewhat retarding the drilling operations and in increasing their cost. These steps may consist, for example, in replacing the drilling mud with water, circulating said water, swabbing and washing the walls of the borehole to remove the mudsheath therefrom as completely as possible, and replacing the water with an aqueous or a non-aqueous liquid comprising a radioactive tracer material and forcing said liquid into the formations.

It is an object of the present invention to provide a radiological logging method which may be carried out during normal drilling operations, thus avoiding the necessity of the above conditioning steps, and eliminating the costs and delays involved in repeated changes of the liquid filling the borehole.

It is also an object of this invention to provide a method wherein the radiological logging of boreholes is effected by adding a radioactive tracer material to the mudflush used in drilling said boreholes.

It is also an object of this invention to effect the logging of boreholes by means of a radiological detector responsive to the radioactive tracer material deposited on the walls of the borehole or in a region immediately adjacent said borehole by the mudflush to which said material has been added.

It is also an object of this invention to provide a method whereby it is possible, in subsequent operations, to determine the completeness of the removal of the mudsheath from a particular portion of the borehole.

It is also an object of this invention to provide a method whereby it is possible to determine, during regular drilling operation, the presence and location of cavities or enlarged portions of the borehole.

These and other objects of the invention will be understood from the following description, taken with reference to the attached drawings, wherein:

Fig. 1 is a diagrammatic representation of a borehole surveyed according to the method of the present invention; and Fig. 2 is a graph showing the type of well log obtained by the method of the present invention.

Fig. 1 shows a typical installation at a borehole 20, which may be provided in its upper portion with a casing and casinghead 8.

A pump 10 has its low pressure side in communication, through a pipe 16, with the drilling fluid or mudflush supply pit or ditch 19, and its high pressure side in communication, through a pipe 9, with the swivel 3, supported on the derrick (not shown).

It is understood that, during drilling, the swivel 3 normally supports the drill string and drill bit, which may be disconnected and removed, as shown in Fig. 1, and that the circulation of the mudflush during drilling is effected from pit 19 through pipe 16, pump 10, pipe 9, swivel 3, downwards through the drill string and drill bit, upwards through the space between the drill string and the walls of the borehole 20 (or casing 8), and back to pit 19 through pipe 15. A tank or reservoir 11 may be connected, through a pipe 12 having a valve 14, with the mudflush circuit.

The drilling fluid or mudflush is prepared in a manner suitable for the particular local conditions and well known to those familiar with the art of mudflush control. It may, for example, comprise clay or bentonite suspended in an aqueous base liquid, with or without the addition of weighting materials such as barytes or iron oxide, or it may comprise a solid material, such as clay or calcium carbonate, dispersed or suspended in a non-aqueous base liquid, such, for example, as a crude mineral oil or a mixture thereof with blown asphalt.

It is known that an essential property of a satisfactory mudflush is its plastering property, that is, its ability to form a sheath on the walls of a borehole, which prevents the liquid base or component of the mudflush from escaping into the formation, and which likewise keeps unstable formations, such as heaving shale, from crumbling into the borehole.

The thickness of the mudsheath is a function not only of the plastering properties of the mudflush, but also of the physical characteristics of the various formation layers transversed by the borehole.

The formation of the mudsheath is due to the fact that, as the drilling proceeds and the mudflush is circulated under pressure in the borehole, a certain portion of the liquid component of the mudflush tends to penetrate the surrounding formations, while the solid and/or colloidal particles suspended in said liquid become deposited on the walls of the borehole, which act in the manner of a filter.

If a borehole passes through a plurality of layers which have different properties of permeability and porosity, these properties will affect the thickness of the mudsheath formed on the walls of the borehole opposite each of said layers in that regard that substantially no mudsheath will form opposite impervious formations such, for example, as shale or dense lime, whereas a sheath of considerable thickness (depending on the particular mudflush used) may form opposite permeable or porous sands having a permeability such, for example, as 500 millidarcies.

Thus, if layers A and C, shown in Fig. 1, are relatively permeable or porous, while layer B is relatively non-permeable, a relatively large amount of the liquid base of the mudflush will penetrate said layers A and C, while only a small or sometimes negligible amount will penetrate layer B.

The amount of solid and/or colloidal matter deposited on the walls of the borehole, and consequently the thickness of the mudsheath, formed opposite layers A and B, as shown at 21 and 23, will therefore be much greater than that deposited opposite layer B, as shown at 22, which is zero in extreme cases.

The method of the present invention consists therefore in adding a radioactive material to the mudflush used in drilling a well, and in allowing said material to become deposited or distributed in the mudsheath covering the walls of the borehole and in the formations immediately behind said mudsheath as a function of the permeability and the porosity of the formation layers traversed by the borehole at different levels.

This radioactive material may consist of or comprise suitable substances prepared from radium-bearing ores, finely ground carnotite, or from artificially prepared, activated or energized radioactive metals or compounds, such as radioactive zinc, iron, cobalt, etc., or any other radioactive isotopes (such, for example, as tabulated on pages 31–43, "Review of Modern Physics," volume 12, No. 1, January 1940) properly selected with regard to their life-period, their commercial availability, and the type of radiation emitted thereby.

This radioactive material may be added to the mudflush in any desired and convenient manner, for example, by admixing it to the clay, barytes or any other solid components of the mudflush.

A preferred way, however, is to convert said radioactive tracer material to a salt or soap soluble in a liquid completely miscible with the liquid component of the mudflush, salts being preferably used with water-base mudflushes, and soaps with oil-base mudflushes.

Thus, assuming for the sake of an example, that the borehole is being drilled with a mudflush having mineral oil and blown asphalt as its liquid component, a desired amount of a radioactive zinc may be converted to a desired type of zinc soap, which is then dissolved in a relatively small quantity of a non-aqueous liquid such, for example, as mineral oil, naphtha, benzol, pyridine, toluene, carbon tetrachloride, etc. If the well is being drilled with an aqueous base mudflush, a suitable radioactive metallic salt or soap may similarly be dissolved in water or in a liquid completely miscible therewith. This solution may then be placed in the reservoir 11, and injected into the stream of a mudflush circulated in the borehole by the pump 10. This addition of the radioactive material to the mudflush may be effected at the very beginning of the drilling operations, or at any time during the progress thereof, for example, upon reaching the depth of certain formations whose porosity and permeability it is desired to investigate.

Concentrations of the radioactive material in the mudflush varying between $1\times10^{-11}$ and $3\times10^{-10}$ curies per cubic centimeter of mud may be successfully used, depending on the natural radioactive properties of the formations through which the well is bored.

When a mud comprising the above radioactive tracer material is circulated in the borehole during drilling, a mudsheath possessing relatively concentrated radioactive properties is formed on the walls of the borehole due to the adsorption of the radioactive element on the solid or colloidal particles of the mudflush, of which said mudsheath is formed, or to exchanges with other elements present therein.

In some cases, and particularly when it is not so much desired to survey a borehole with a view to obtaining a qualitative radioactive log indicating permeable and dense formations, as with a view to obtaining a log indicating porous layers, it may be desirable to control the ratio between the amount of the radioactive material, which becomes incorporated in the mudsheath, and that which may penetrate a porous formation directly behind such mudsheath.

Assuming, as an example, that an amount of $10^{-4}$ curies of radio-zinc had been added in the form of radioactive zinc chloride to about 2000 gallons of mudflush consisting of clay suspended in water, the amount of the radioactive material which would become incorporated in the mudflush due to adsorption on the clay may be decreased by adding to the mudflush a further amount of non-radioactive zinc chloride in quantities sufficient to minimize the effect of natural adsorbing forces, such as, for the example given, about 100 grams of non-radioactive zinc chloride which salt would have in such case a concentration approximately a million times greater than that of the radioactive zinc chloride.

After drilling the borehole to any desired depth, the drill string and drill pipe are withdrawn, as shown in Fig. 1, the radioactive mudflush may be removed and replaced with a neutral mudflush or with any other suitable liquid, and a radiological detector 18 is lowered into the borehole. A lubricator 6 may be used for this purpose if it is desired to maintain the well under pressure. The detector is lowered into the well over a metering reel arrangement 4, adapted to indicate its depth, so that the indications of the detector at any moment may be related to the proper depth, and is supported by a cable 17, comprising one or more insulated electrical conductors to transmit the indications of the detector to the receiving apparatus 5 at the surface, which may, for example, comprise suitable amplifying, indicating or recording devices.

As the detector is lowered or raised throughout the borehole or any particular desired portion thereof, its indications will be responsive to the amount of the radioactive material in its direct proximity. Since, as explained above, the walls of the borehole opposite permeable formations will have deposited thereon a radioactive mudsheath, whereas no such mudsheath will be present opposite impervious formations, and since, furthermore, porous formations will absorb and hold therein considerable amounts of the radioactive liquid, whereas substantially no such liquid will be present in dense formations, it will be seen, referring to Figs. 1 and 2, that the response of the detector to the amount of the radioactive material in its proximity will be relatively strong at the level of formations A and C, as indicated at 31 and 33 in Fig. 2, and relatively weak at the level of formation B, as indicated at 32, Fig. 2, being a graph or detector record obtained according to the present method under conditions corresponding to those in Fig. 1.

It should be noted that although, as described above, it may sometimes be preferred to replace the radioactive mudflush with a neutral liquid before making a detector run, this step is in no way essential to the operativeness of this process.

The outside diameter of the housing of the detector is usually selected to fit closely the diameter of the borehole. Thus, a detector having an outside diameter of 3¾ inches may be selected for use in a 4½ inch borehole. The presence of a thin annular layer (of a thickness of some ⅜ of an inch, for the above example) of the radioactive mudflush around the detector is not sufficient to obscure the effects exerted thereon by the mudsheath, since, as stated above, the radioactive tracer material is present in the mudsheath in considerably higher concentrations than in the mudflush. Significant readings may therefore be obtained even in cases when, to expedite operations and to provide for a quicker resumption of drilling, it is not thought necessary to replace the radioactive mudflush with a neutral fluid or liquid before logging the borehole.

The radioactive mudflush may also be purposely left in the borehole in order to obtain some particular type of information. Thus, if it is suspected that there exists a cavity or enlargement of the diameter of the borehole, such as shown at 24 in Fig. 1, and it is desired to determine the location and the dimensions of said cavity, the detector 18, if lowered into the borehole filled with the radioactive mud, will register a stronger response opposite said cavity, as shown at 34 in Fig. 2, said response being a function of the amount of radioactive mud filling said cavity or enlargement.

Although, as described above, the present invention finds its main application during the drilling operations in determining the physical characteristics of the formations traversed by a borehole and in correlating said formations, it may likewise be applied for other useful purposes.

If a mudsheath is formed on the walls of a borehole according to the present invention, that is, by incorporating thereinto some radioactive material, said sheath may be used for reference purposes at any desired subsequent period of the life of the well. Thus, if a well had been sunk through a plurality of formation layers, including an oil-bearing layer, and a sheath formed on the walls of the borehole, it may be necessary to remove the sheath from that portion of the borehole passing through the oil-bearing layer to permit the flow of oil into the borehole. Likewise, when a perforated liner is set opposite an oil-bearing layer or zone in order to produce said zone, it is essential to know whether the mudsheath has been completely removed from behind said liner so as not to interfere with the flow of oil from the formation to the borehole. Heretofore, there were no direct means to determine the thoroughness of this removal, which could only be judged or estimated from subsequent production figures. With a radioactive mudsheath, however, a radiological detector can be run into the well to determine whether the mudsheath opposite the oil-bearing layer has been completely removed or not, whereafter recourse may be had to further washing and swabbing to remove any portions of the mudsheath which the indications of the detector may have shown to be still present on the face of the oil-bearing formation or behind the liner.

It is understood that in the present specification and claims the term "fluid" is not used to define any gaseous phase, but only a liquid phase having solid or colloidal matter dispersed or suspended therein, the terms "mudflush" and "drilling fluid" having furthermore an identical meaning attached thereto, as common in production practice.

I claim as my invention:

1. A method of determining the permeability of the various strata penetrated by a borehole, comprising the steps of incorporating with the drilling fluid used in drilling the borehole a non-radioactive salt of a metal and a radioactive salt of the same metal, said salts being soluble in said fluid, the concentration of the second salt being extremely small as compared with that of the first salt, and subsequently using an electronic method to determine the concentration of the radio-active salt along the borehole.

2. A method of determining the permeability of the various strata penetrated by a borehole, comprising the steps of incorporating with the drilling fluid used in drilling the borehole a non-radioactive salt of a metal and a radio-active salt of the same metal, said salts being soluble in said fluid, the concentration of the second salt being of the order of one-millionth of that of the first salt, and subsequently using an electronic method to determine the concentration of the radio-active salt along the borehole.

MAURICE M. ALBERTSON.